United States Patent [19]

Vindum

[11] 4,256,088

[45] Mar. 17, 1981

[54] SOLAR CONCENTRATOR UTILIZING A POINT FOCUSING SOLAR CONCENTRATING PANEL ASSEMBLY

[75] Inventor: Jorgen O. Vindum, San Ramon, Calif.

[73] Assignee: Acurex Corporation, Mountain View, Calif.

[21] Appl. No.: 942,350

[22] Filed: Sep. 14, 1978

[51] Int. Cl.³ .................................................. F24J 3/02
[52] U.S. Cl. .................................. 126/418; 126/438; 343/882; 350/289
[58] Field of Search ............... 126/338, 337, 426, 424, 126/418; 343/766, 882, DIG. 1; 350/288, 289, 306

[56] References Cited

U.S. PATENT DOCUMENTS

| 787,145 | 4/1905 | Brown | 126/438 |
|---|---|---|---|
| 811,274 | 1/1906 | Carter | 126/424 |
| 1,386,781 | 8/1921 | Harvey | 126/438 |
| 3,058,394 | 10/1962 | Edlin | 126/438 |
| 3,884,217 | 5/1975 | Wartes | 126/424 |
| 4,026,269 | 5/1977 | Stelzer | 126/438 |
| 4,169,712 | 10/1979 | Boyce | 126/424 |
| 4,171,876 | 10/1979 | Wood | 126/438 |

*Primary Examiner*—Samuel Scott
*Assistant Examiner*—G. Anderson
*Attorney, Agent, or Firm*—Flehr, Hohbach, Test, Albritton & Herbert

[57] ABSTRACT

A solar concentrator is disclosed herein and includes a modularized point focusing solar concentrating panel which is movably mounted to track the sun. This panel has an overall parabolic reflecting surface and a triangular or approximately triangular configuration which improves structural integrity, minimizes wind resistance and permits rapid and easy stowing.

12 Claims, 13 Drawing Figures

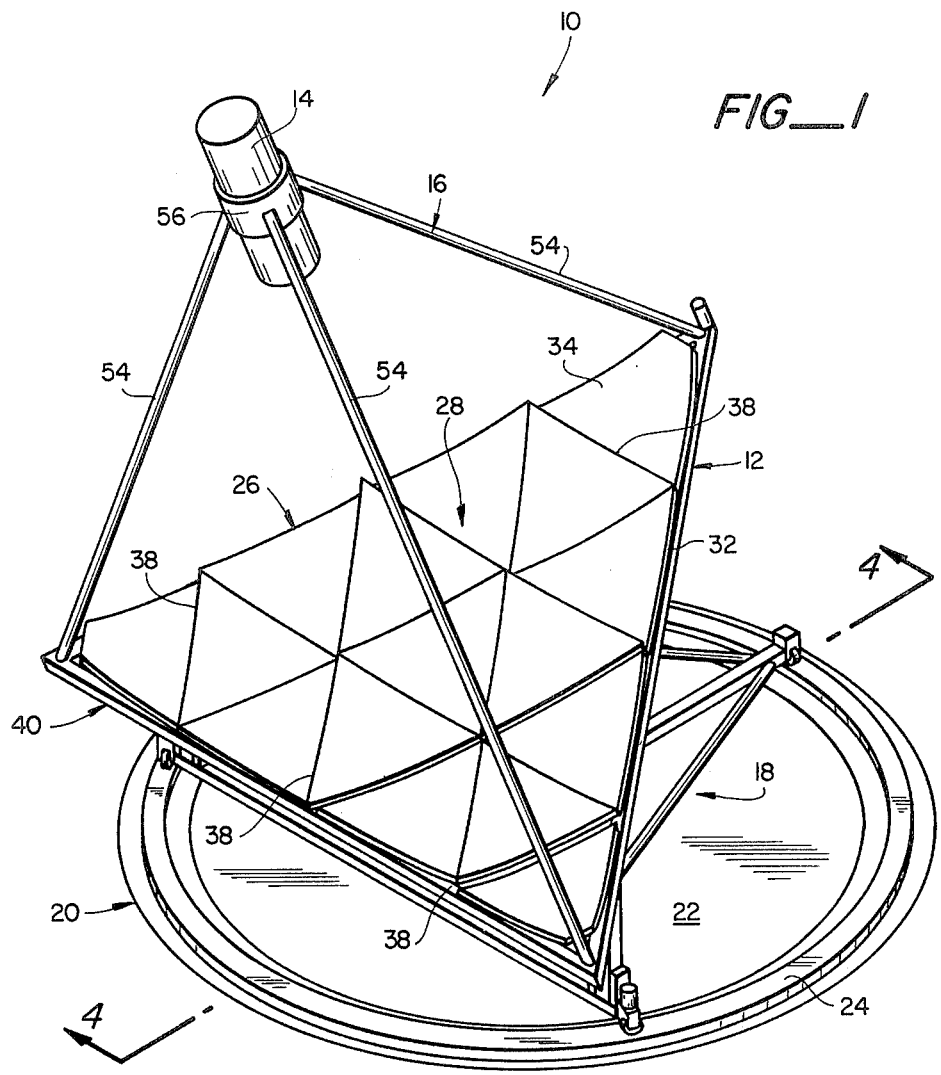
FIG_1
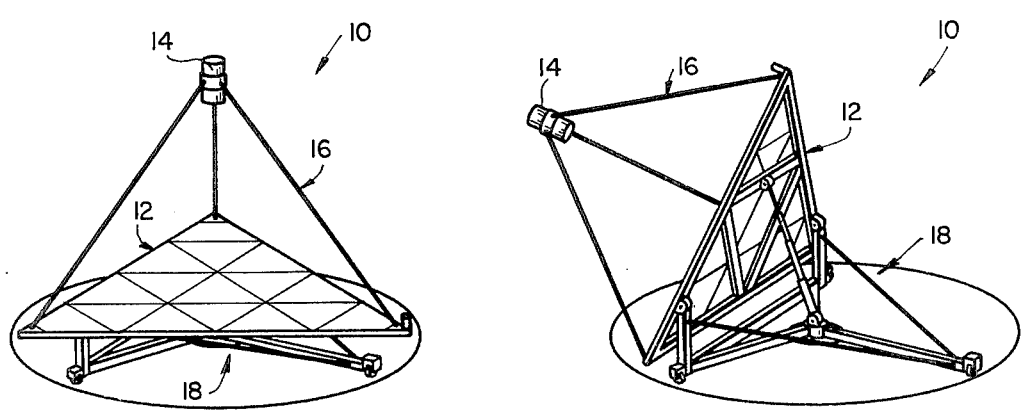
FIG_2        FIG_3

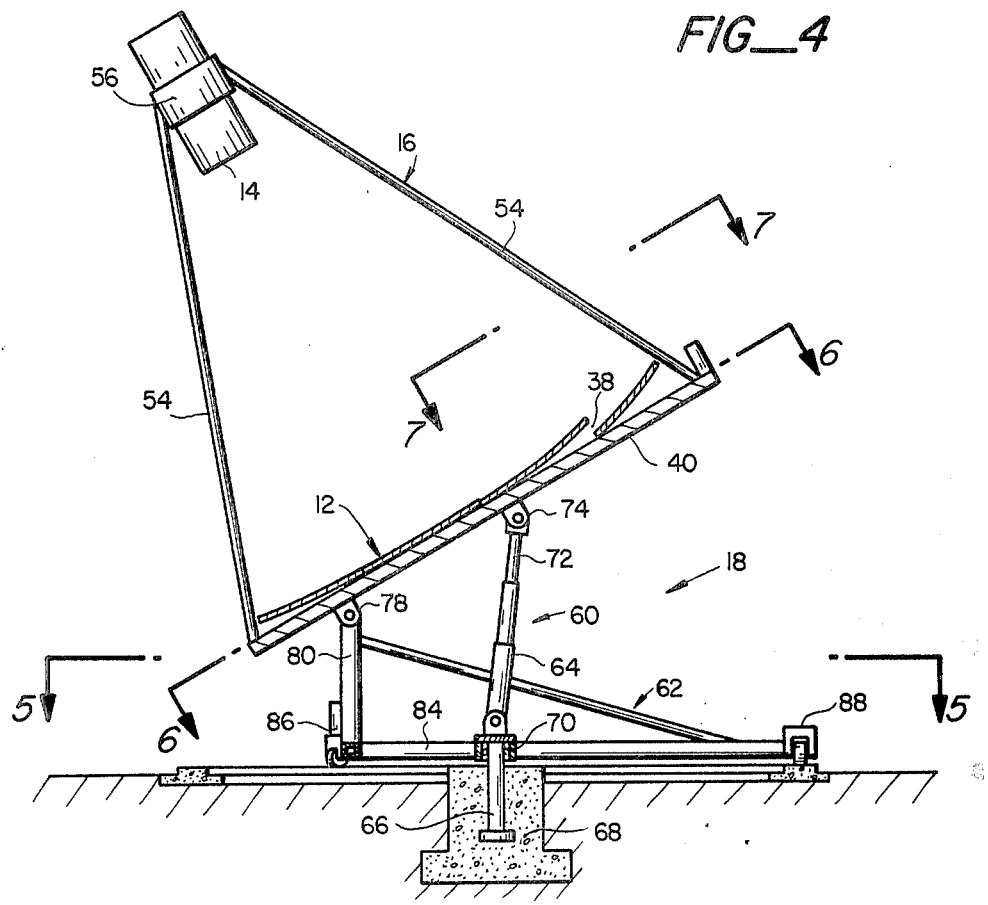
FIG_4
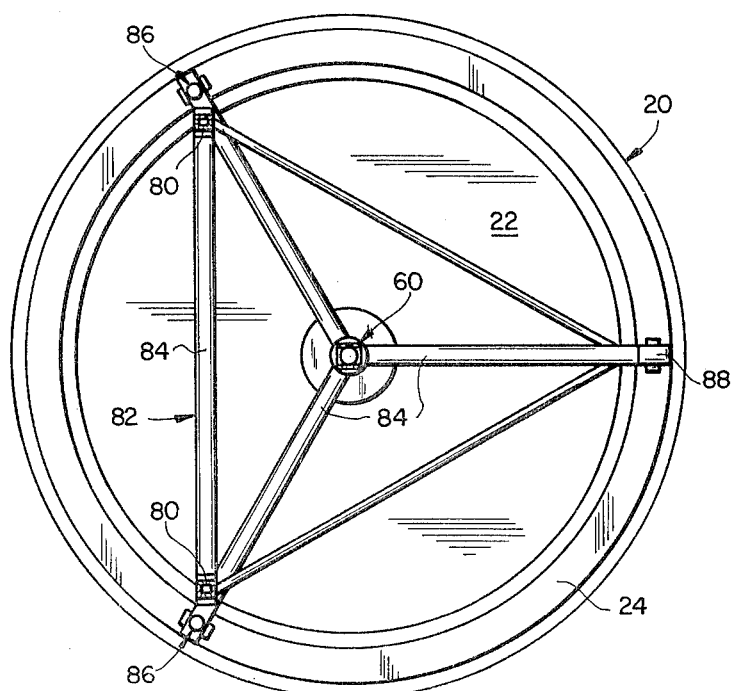
FIG_5

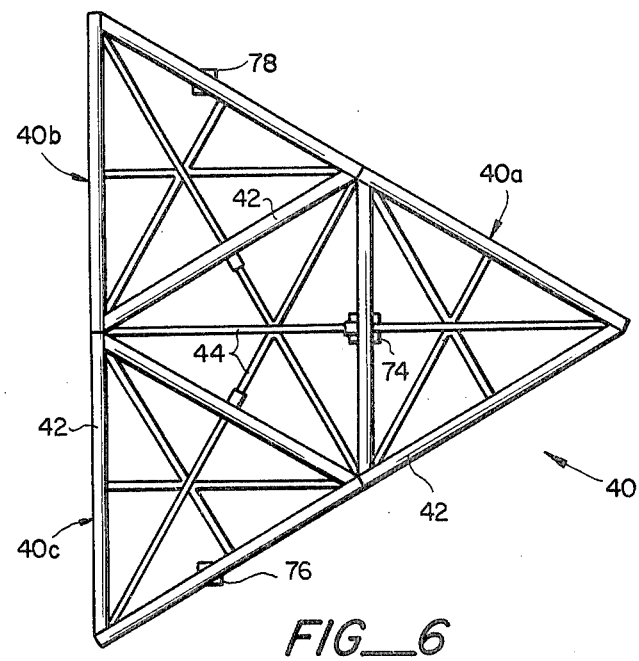
FIG_6
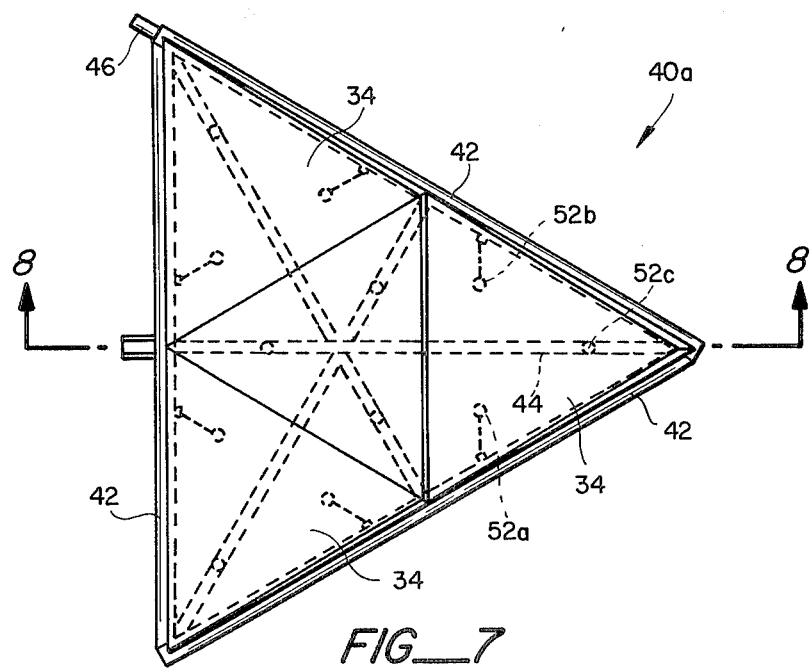
FIG_7
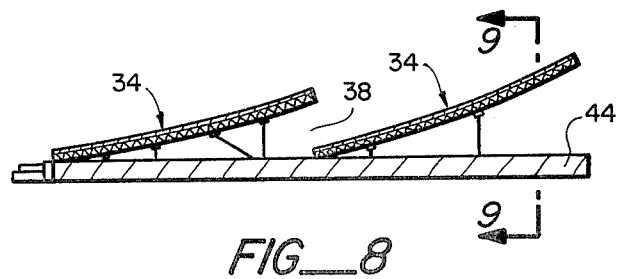
FIG_8

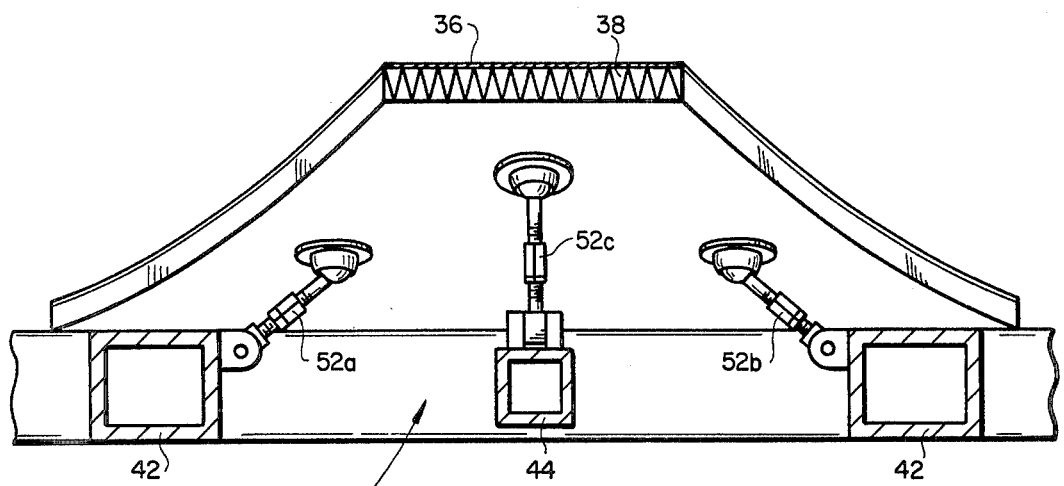
FIG_9
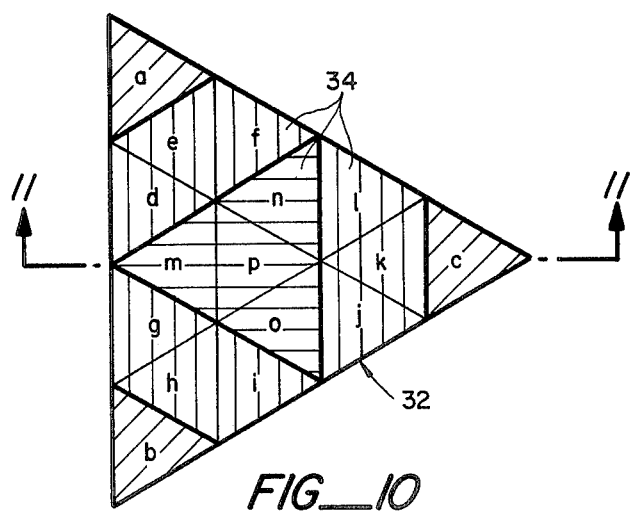
FIG_10
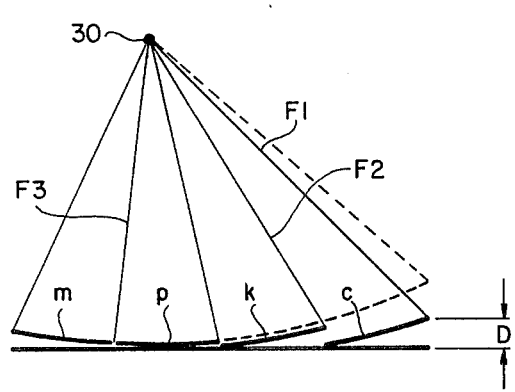
FIG_11

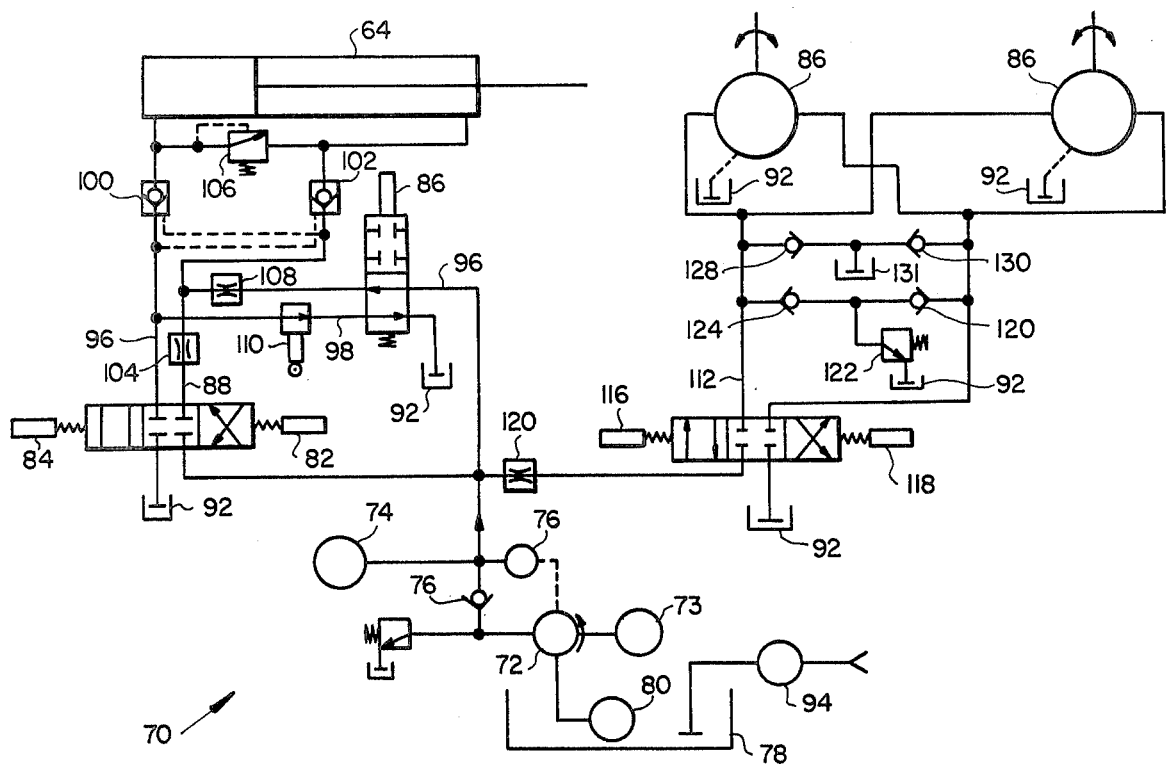
FIG__12
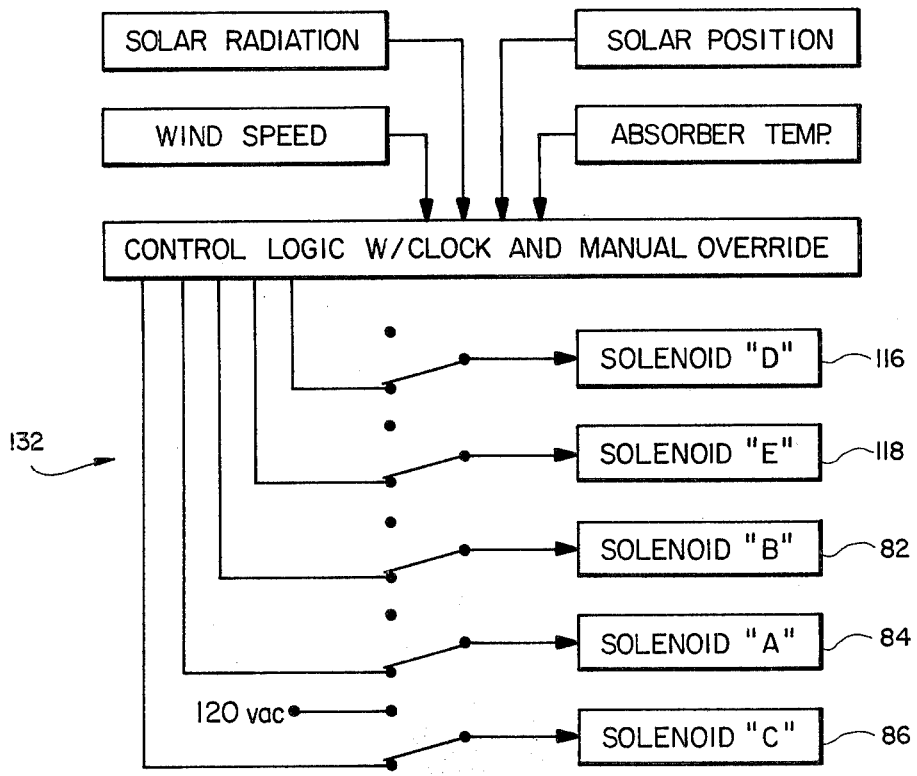
FIG__13

SOLAR CONCENTRATOR UTILIZING A POINT FOCUSING SOLAR CONCENTRATING PANEL ASSEMBLY

BACKGROUND OF THE INVENTION

The present invention relates generally to solar collectors and more particularly to a solar concentrator which utilizes a particularly designed point focusing solar concentrating panel and particular means for supporting the panel in a sun tracking mode.

There are many different types of solar energy systems disclosed in and made available by the prior art. One such system includes a point focusing solar concentrating panel which is operated in a solar tracking mode, that is, which is moved along with the sun for maintaining a constant alignment therewith. While the general operating principles underlying the solar tracking panel of this general type are sound, the panels themselves and associated equipment as disclosed in the prior art have not been completely satisfactory. For the most part, the panels have been circular (and in some cases rectangular) and have been bulky and massive in design, thereby resulting in relatively high wind load problems which in turn has required the use of relatively heavy duty and expensive support structure. In addition, by the very nature of its massive design, this type of prior art panel cannot be economically mass produced, relatively speaking and it cannot be easily transported to the operating site, and, once at the operating site, it cannot be easily installed.

As will be seen hereinafter, the present invention is directed to the utilization of a point focusing solar concentrator which overcomes the various drawbacks just recited as well as including other advantages not found in the prior art. For example, the point focusing solar concentrator disclosed herein is one which includes a relatively light weight point focusing panel designed to reduce wind load and, as a result of the panel design, a less massive and more economical support structure. Moreover, the panel itself is modularized and, hence, lends itself to mass production and may be economically delivered to the operating site and easily assembled once there. Other features of the present invention will become apparent hereinafter.

OBJECTS AND SUMMARY OF THE INVENTION

One object of the present invention is to provide a point focusing solar concentrating panel which is uncomplicated in design, economical to provide and reliable in use.

Another object of the present invention is to provide a point focusing solar concentrating panel which is light weight and structurally sound and which is designed to reduce wind load during operation.

Still another object of the present invention is to provide a modularized point focusing panel and particularly one which lends itself to mass production, which can be economically delivered to its ultimate operating site and which can be easily and rapidly assembled and installed.

A further object of the present invention is to provide an uncomplicated yet reliable solar concentrator system including a panel of the above recited type and a light weight and economical arrangement for supporting the panel in a solar tracking mode.

Still a further object of the present invention is to provide an overall system which is operated to minimize the possibility of wind damage to its panel during operation.

Still a further object of the present invention is to provide a panel support arrangement which accurately and reliably drives the panel in a solar tracking mode.

As will be seen hereinafter, the point focusing solar concentrating panel disclosed herein is one which includes an overall reflecting surface of parabolic cross sectional configuration having a predetermined focal point and an outermost triangular periphery or a periphery which approximates a triangle. In this regard, the outermost points of the triangle could be omitted without compromising the attendent advantages of a triangle to any appreciable degree. This reflecting surface serves to interrupt solar energy and reflect and focus it into a receiver which, along with the panel comprises part of an overall solar concentrator or concentrating system. In this regard, the receiver itself could comprise part of a separate solar power tower physically unconnected with the panel and, in this case, the panel would serve as a heliostat. In any event, this system also includes means for pivotally mounting the triangular panel while maintaining one side parallel with a fixed planar surface, means for tilting the panel about a horizontal axis, and means for rotating it about a vertical axis, whereby to track the position of the sun from sunrise to sunset. Other aspects of the overall solar concentrating system and the panel itself will be discussed in more detail hereinafter.

BRIEF DESCRIPTION OF THE DRAWINGS

FIG. 1 is a perspective view of an overall solar concentrating apparatus of the point focusing type which is constructed in accordance with the present invention.

FIG. 2 is a perspective view illustrating the solar concentrating apparatus of FIG. 1 in a stowed position.

FIG. 3 is a perspective view illustrating the solar concentrating apparatus in a particular operating position.

FIG. 4 is a sectional view of the solar concentrating apparatus taken generally along line 4—4 in FIG. 1.

FIG. 5 is a sectional view of the solar concentrating apparatus taken generally along line 5—5 in FIG. 4.

FIG. 6 is a sectional view of the solar concentrating apparatus taken generally along line 6—6 in FIG. 4.

FIG. 7 is an enlarged sectional view of the solar concentrating apparatus taken generally along line 7—7 in FIG. 4.

FIG. 8 is a sectional view of the solar concentrating apparatus taken generally along line 8—8 in FIG. 7.

FIG. 9 is an enlarged perspective view, in section, of the solar concentrating apparatus, taken generally along line 9—9 in FIG. 8.

FIG. 10 is a diagrammatic illustration, in plan view, of a point focusing solar concentrating panel which comprises part of the overall apparatus illustrated in FIGS. 1 to 9 and which, in and by itself, is constructed in accordance with the present invention.

FIG. 11 is a diagrammatic illustration of the panel assembly as viewed along lines 11—11 in FIG. 10.

FIG. 12 is a schematic illustration of a hydraulic control arrangement comprising part of the overall solar concentrating apparatus.

FIG. 13 is a block diagram of an electrical control arrangement comprising part of the overall apparatus.

DETAILED DESCRIPTION AND PREFERRED EMBODIMENTS

Turning now to the drawings, wherein like components are designated by like reference numerals throughout the various figures, attention is specifically directed to FIG. 1 which illustrates an overall solar concentrating apparatus 10 constructed in accordance with the present invention. This overall apparatus includes a point focusing solar concentrating panel 12, a receiver 14 and receiver support arrangement 16 fixedly connected with the panel and a panel support arrangement 18. As will be discussed in more detail hereinafter, solar concentrating panel 12 serves to interrupt and reflect solar energy and focus it into receiver 14 which is adapted to convert this energy into another form. Arrangement 18 serves a number of purposes. First, it physically supports the panel, receiver and receiver support arrangement over a fixed foundation 20 defining an uppermost, horizontally extending surface 22 and an upwardly projecting annular track 24. Arrangement 18 also serves to rotate panel 12 and its associated carrier along track 24 while simultaneously pivoting the panel and carrier in order to provide a two axis solar tracking mode.

As will be seen hereinafter, panel 12 and interconnected receiver 14 are pivotally movable between two extreme positions, a substantially horizontally extending stowed position illustrated in FIG. 2 and an extreme upright, almost vertical operating position illustrated in FIG. 3. The panel is maintained in its stowed position in response to and during extreme wind conditions in order to reduce the possibility of damage thereby. During solar tracking the panel is maintained in an operating position that is in a position between its upright position shown in FIG. 3 and its stowed position of FIG. 2, depending upon the location of the sun. At the same time, the panel is moved along track 24.

Turning specifically to FIGS. 6 to 11 in conjunction with FIG. 1, attention is specifically directed to the structural details of point focusing panel 12. This panel includes an overall reflector 26 defining an overall reflecting surface 28 of parabolic cross sectional configuration having a predetermined focal point 30 (see FIG. 11) and an outermost triangular periphery 32. In an actual working embodiment, this overall reflector extends approximately forty feet on each side, which corresponds to a nominal aperture of 690 FT$^2$ with an estimated thermal output of 26KW$_{th}$ to 33KW$_{th}$ for expected ranges of performance related parameters. In other words, the reflector in an actual working embodiment is quite large. Nevertheless, by virtue of its triangular shape, the reflector can be supported so that most of its frontal area is close to the ground, that is, to horizontal surface 22 of foundation 20, where the wind velocity is lower. More specifically, due to what is known as the "boundary layer effect", the force exerted by the wind increases rapidly with height so that a triangle experiences a much lower wind load than a circle of equivalent area. The use of a triangular structure may also result in lower weight since triangles are inherently more efficient structurally (higher stiffness to weight ratio) than many other shapes. It is to be understood that these advantages would for the most part still exist if the extreme points of the triangle were eliminated so that the outer periphery only approximated a triangle.

As illustrated best in FIG. 1 in conjunction with FIG. 10, overall reflector 26 is comprised of a plurality of individual surface reflecting modules 34 which are also triangular in shape. In the preferred embodiment, each module is an equilateral triangle fabricated from a bonded structure including a drawn aluminum face sheet 36 located over a paper honeycomb core 38, as best illustrated in FIG. 9. In this way, the individual modules can be manufactured economically and with relatively little weight. In an actual working embodiment sheets 36 carry outer reflective surfaces of aluminized acrylic film which together define overall parabolic reflecting surface 28 having fixed focal point 30. However, as will be seen, this overall surface is actually three distinct parabolic reflecting surfaces, each having a different focal length but the same focal point, specifically focal point 30.

In the embodiment illustrated, 16 individual reflecting modules 34 are utilized to construct reflector 26. In actual working embodiments where the overall reflector extends forty feet on each side, each individual module extends ten feet on each side. As stated above, these individual modules together define three distinct parabolic reflecting surfaces which together define the overall surface 28. This is best illustrated in FIGS. 10 and 11. As seen in FIG. 10, the various modules can be subdivided into three groups, a first group consisting of modules a, b and c, a second group consisting of modules d, e, f and so on, to and including module 1 and a third group consisting of modules m, n, o and p. As seen best in FIG. 11, these three groups of modules define three distinct parabolic reflecting surfaces, all sharing the same focal point 30. The modules a, b and c together define a first parabolic reflecting surface having the focal length F1. The second group consisting of modules d, e, f and so on, together define a second parabolic surface having the focal length F2. The third group consisting of modules m, n, o and p together define a third parabolic surface having the focal length F3. In an actual working embodiment this requires only six different modules. The modules a, b and c form one identical group, modules m, n and o another, modules e, h and k still another, modules d, i and 1 het another, modules f, h and g a further identical group and finally p by itself.

The utilization of individual modules to define multiple parabolic surfaces in the overall reflecting scheme has a number of advantages. In the first place, this technique has been used to compress the depth of the paraboloid dish (the entire reflecting surface) to 61% of its normal value in an actual working embodiment of the present invention. More specifically, for a 45° rim angle and a nominal forty feet triangle (the total reflecting surface), a single paraboloid reflector has a depth of 4.78 feet whereas the compressed reflector designed in accordance with the present invention, that is, with three distinct reflecting surfaces, has an overall depth (generally indicated at D) of only 2.91 feet. This has the distinct advantage of reducing lateral aerodynamic loading during operation of the overall panel and also while it is stowed. In addition, as a result of providing these different parabolic surfaces, empty or axial clearance areas occur at the transitions between paraboloids (that is, between adjacent modules from different groups) as best illustrated in FIGS. 1, 4 and 8. These empty spaces or axial clearances, generally indicated at 38, serve as vent areas which also act to reduce wind loading laterally across the reflector. This reduced wind loading due to the vents and reduced lateral profile permit the overall reflector to be supported by a lighter, more economical support structure, as will be seen hereinafter.

Having described reflector 26, attention is now directed to a reflector support structure 40 which also comprises part of panel 12 and which is provided for supporting the various surface reflecting modules 34 in the positions described above. As best illustrated in FIG. 6, this support structure is actually a triangular framework of welded tubes, preferably steel tubes having square cross-sections. This triangular frame may be separated into three shop-fabricated equilateral triangular frames 40a, 40b and 40c, each of which includes three side defining tubes 42 and central cross tubes (center bracing) 44. The frame 40a is shown alone in FIG. 7 supporting four modules 34. From FIG. 6, it can be seen that these three triangular frames are welded together along with center bracing to form the overall triangular framework illustrated. In an actual working embodiment, this overall framework is forty feet on each side (the same as the reflector) and each individual triangular frame is twenty feet each side and support four modules (a total of twelve) with four being supported in one center triangle (a total of sixteen).

The overall reflector support structure just described is modularized to allow simple mass-producable sections to be field assembled into a rigid large-scale structure. All three frame sections are identical with the exception of three pivot welds to be discussed hereinafter. The sections are easily joined by dowels generally indicated at 46 in FIG. 7 to minimize alignment error, field welding, and labor.

As stated above, structure 40 is provided for supporting the individual modules 34 in their necessary positions to provide the three distinct parabolic surfaces previously described. Accordingly, the overall panel includes a module-to-structure connecting arrangement 50 associated with each module. One such arrangement is specifically illustrated in FIG. 9 and, as will be seen, is provided for connecting its associated module to a corresponding part of the structure 40 at three points. This connecting arrangement preferably should be of the type which allows simple adjustment of the module relative to the frame for more accurately placing the module in its proper position relative to the other modules, especially in the field. In this way, the modules can be "fine tuned" to more accurately provide the previously described parabolic surfaces. In the embodiment illustrated, each connecting arrangement is comprised of three ball and socket type of interconnect mechanisms 52a, 52b and 52c. As illustrated in FIG. 9, each of the interconnect mechanisms 52a, and 52b is connected at one end to a side tube 42 and extends towards the back of the module, actually to the back of core 38 at an angle where its ball joint is connected thereto. The interconnect mechanism 52c also extends at an angle but does so between the center brace 44 and the back of core 38. All of the modules are connected to the overall framework in this manner which allows each to be individually adjusted positionally relative to the others. The primary advantage to this is that the panel can be adjusted or fine tuned in the field using the solar image formed by each module as an alignment aid. This fine tuning capability will minimize the adverse effects resulting from manufacturing the frame assembly outside design tolerances or otherwise allow the tolerances to be changed.

Having described both reflector 26 and its support structure 40, attention is now directed to receiver 14. This receiver may be of any conventional type which is capable of converting focused solar energy to another form. For example, this receiver may be a steam turbine boiler, a water heater or the like. While not shown, this receiver necessarily includes an absorber which is located at focal point 30 in confronting relationship with reflecting surface 28. The receiver is supported in this position by means of support structure 16, as stated previously. As best illustrated in FIG. 1, this support structure is comprised of three tubular struts 54 and a receiver support ring 56 bolted around and fixed to the receiver. The support struts are fixedly connected with the support ring and respectively extend to and are fixed with three points on triangular frame 40. The receiver support struts 54, like structure 40, are preferably modularized to the extent that they can be readily assembled in the field by attachment to suitable dowels (not shown) provided with the overall frame. Similar dowels can be provided on receiver ring 56.

Having described overall panel 12, receiver 14 and receiver support arrangement 16, attention is now directed to arrangement 18 which, as stated previously, is provided for supporting the panels between an inoperative (stowed) position and a solar tracking mode. The structural aspect of this arrangement is best illustrated in FIGS. 4 and 5 in conjunction with FIGS. 2 and 3. As seen in these figures, arrangement 18 includes a panel pivoting assembly 60 and a panel rotating assembly 62 for providing the two axis movement of panel 12 described previously with respect to FIGS. 1 to 3. More specifically, assembly 60 is provided for pivoting the panel between its stowed position in FIG. 2 and its upright position in FIG. 3 while assembly 62 is provided for simultaneously rotating the panel about track 24.

As illustrated best in FIG. 4, pivoting assembly 60 includes a hydraulic cylinder 64. The cylinder is attached to foundation 20 by means of a pivot post 66 which is provided within a center pivot anchor embedded within the foundation at the center of track 24. A roller bearing 70 is utilized in connecting the cylinder to the pivot post so as to allow rotation of the cylinder (during rotation of the panel) regardless of the angle between the cylinder and the pivot post. A cylinder rod generally indicated at 72 is pivotally attached to the reflector support structure 40 by means of a pivot flange 74 which is fixedly connected with the reflector support structure 40 and located inwardly of its outer periphery as best seen in FIG. 6. The overall pivot assembly also includes two additional pivot flanges 76 and 78 which are fixedly located to structure 40 on opposite sides thereof and spaced from flange 74, as also best seen in FIG. 6. Two vertically extending uprights or posts 80 are fixedly connected at their lower ends to rotating assembly 62 and are pivotally connected with flanges 76 and 78 for supporting structure 40 and hence the entire panel for the pivotal movement described previously, specifically for pivotal movement about a horizontal axis through the flanges 76 and 78. The hydraulic cylinder provides the drive for this movement. When the panel is in its stowed position, the cylinder is fully retracted and the reflector surface is aimed substantially vertically, offering minimum wind resistance. When the cylinder is fully extended, the reflector is in its upright position.

Turning to rotating assembly 62, attention is specifically directed to FIG. 5 in conjunction with FIGS. 1 to 4. As illustrated in FIG. 5, the rotating assembly includes a triangular frame 82 which, like previously described frame structure 40, is modularized, that is, it includes a number of innerconnecting tubes 84. This assembly also includes three wheel assemblies, two hydraulically driven wheel assemblies 86, and a stabilizing assembly 88. The two hydraulic assemblies actually rotate the triangular structure 82 about previously described track 24 which, in turn, rotates panel 12 by means of interconnecting uprights or posts 80.

The utilization of hydraulics in both pivoting and rotating panel 12 has a number of advantages. First, hydraulics have the advantage of low maintenance and low initial cost. Second, hydraulics have the advantage of high reliability, precision position control and fast response. Moreover, by driving from the wheels rather than from the center pivot, extremely precise azimuthal control is possible. The elevation adjustment cylinder, that is, cylinder 64, permits rapid, safe stowing of the collector when high winds are encountered.

The overall solar concentrating system 10 has been described thus far from a structural and operational standpoint. It is to be understood that this system also includes suitable controls including a conventional two axis shadow band tracker (not shown) appropriately mounted on the panel. These controls including the shadow band tracker are provided for operating pivot assembly 60 and rotating assembly 62, specifically the hydraulic cylinder 64 and the hydraulic drive wheels 86 for moving the solar panel between its stowed position and its solar collecting position and for rotating it for providing two-axis solar tracking. A more detailed discussion of these controls will be provided hereinafter with respect to FIGS. 12 and 13. For the moment, it should suffice to say that the controls in a preferred embodiment, provide automatic tracking from sunrise to sunset. However, when average wind speeds exceed a certain velocity, for example, thirty miles per hour for a predetermined period of time, the system is automatically stowed. In an actual working embodiment, the panel is rotated ±120° from the due south for azimuth tracking, and elevationally adjusted from vertical to 5° from the horizontal. During periods of cloudiness, the panel is moved without guidance from the sun, that is, without the shadow detector.

Turning now to FIG. 12, attention is directed to the hydraulic control scheme, generally indicated at 70, for operating pivoting assembly 60 and rotating assembly 62. As illustrated, this control scheme includes a small hydraulic pump 72 which is driven by an electric motor 73 and which is linked to an accumulator 74 through a check valve 76. With the low flow rate requirements of the overall tracking system, the pump will primarily serve to keep the accumulator charged. A pressure switch 76 at the accumulator energizes the pump only when the accumulator pressure falls below a certain limit so as to pump additional hydraulic fluid to the accumulator from a reservoir 78 through a strainer 80 located within the reservoir.

The previously described hydraulic cylinder 64 which is provided for pivoting panel 12 for adjusting its elevation is diagramatically illustrated in FIG. 12. This hydraulic cylinder is operatively connected with accumulator 74 through a number of control devices to be described including three electrically operated solenoids, a cylinder extending solenoid 82, a cylinder retracting solenoid 84 and a cylinder stowing (retracting) solenoid 86. As illustrated in FIG. 12, while the two solenoids 82 and 84 remain deenergized, the primary lines 88 and 90 between the cylinder and accumulator remain closed as do these lines between the cylinder and hydraulic return generally indicated at 92. While not shown, this return, like the other returns illustrated in FIG. 12, redirects the hydraulic fluid back to reservoir 78 through a filter 94. With solenoid 86 deenergized, the secondary lines 96 and 98 between the cylinder and accumulator and another return 92, respectively, remain open, that is, hydraulic fluid is capable of passing therethrough.

In order to extend cylinder 64 so as to pivot or raise panel 12 to its elevated position, solenoid 82 is energized. This supplies hydraulic fluid into the main line 90 where it passes through the poppet valve 100 and into the back end of cylinder 64. At the same time, energized solenoid 82 opens line 88 to return 92 so that the hydraulic fluid passing into the back end of cylinder 64 thereafter passes into line 88 through poppet valve 102 and a rate adjustement valve 104 provided for adjusting the rate of movement of the cylinder for adjusting the rate of pivoting movement of the panel. A pressure relief valve 106 is provided between lines 88 and 90, as illustrated in FIG. 12. When solenoid 84 is energized, the two lines 88 and 90 are reversed. More specifically, line 88 is opened to the accumulator and line 90 is opened to the return. In this way, the cylinder is retracted.

As described previously, the overall solar concentrating system 10 is designed to move into a stowed position, especially in response to excessive wind conditions. This stowing procedure is controlled by means of solenoid 86. In normal non-stowing operation, this solenoid is energized and the secondary lines 96 and 98 are maintained closed so that hydraulic fluid cannot pass therethrough. Upon command from the control logic, to be described with respect to FIG. 13, or during a power failure, this solenoid is deenergized causing the lines 96 and 98 to open between accumulator 74, the cylinder, and return 92 which forces the cylinder to its retracted or stowed position. In this regard, the cylinder extending solenoid 82 is interconnected with stowing solenoid 86 at the control logic so that solenoid 82 cannot be energized so long as solenoid 86 remains deenergized, thereby preventing the two systems from working against one another. The stowing rate is adjusted by means of rate adjustment valve 108, preferably at a rate of 80° per minute. As the structure folds quickly towards its stowed position, a cam type decceleration mechanical valve 110 is used to smoothly drive the structure into its final stow position. While not shown, a limit switch system is provided as a fail safe.

Having described the way in which cylinder 64 is hydraulically controlled utilizing scheme 70, attention is now directed to the way in which this scheme hydraulically controls the two hydraulically driven wheel assemblies 86. These assemblies which are diagrammatically illustrated in FIG. 12, are connected to accumulator 74 and reservoir 78 through two hydraulic lines 112 and 114, as well as a number of additional hydraulic returns 92. In order to hydraulically control the wheel assemblies, scheme 70 also includes two additional electrical solenoids, specifically a forward drive solenoid 116 and a reverse drive solenoid 118. So long as these two solenoids remain deenergized, lines 112 and 114 remain closed and wheel assemblies 86 remain inoperative, which means that the solar panel remains still. When solenoid 116 is energized, line 112 is opened to the accumulator while line 114 is simultaneously opened to the return. In this way, hydraulic fluid passes through line 112 and thereafter through the wheel assemblies back to the return for driving the wheel assemblies in a forward direction. When the solenoid 118 is energized this procedure is reversed, that is, the line 114 is opened to the accumulator while line 112 is opened to the return. In this way, the wheel assemblies are driven in a reverse or forward direction. A rate adjustment valve 120 is provided for controlling the rate of speed of assemblies 86 and hence the rate of rotation of the panel which is preferably 10° per minute in an actual working embodiment. This scheme also includes a pressure valve 122 and associated poppets 124 and 126. The poppets 128 and 130 and associated fill valve 131 are provided for introducing hydraulic fluid into the system.

It should be apparent from the foregoing that in order for scheme 70 to hydraulically drive system 10 in the desired way, the various solenoids must be controlled to that end. Accordingly, system 10 includes a control logic scheme 132 which is adapted to energize the various solenoids at the appropriate time, depending upon certain conditions. While these conditions may vary, in a preferred embodiment, they include the position of the sun, whether or not the sun is clearly visible (a clear day as opposed to a cloudy day), the wind velocity and the temperature at the receiver absorber. Each of these conditions may be readily sensed by a conventional detection scheme generally indicated by the input boxes in FIG. 13. The box indicated SOLAR RADIATION may include a photocell for indicating whether it is light out or dark out, cloudy or sunny. The box indicated SOLAR POSITION may comprise the previously recited shadow band detector (actually two such detectors) for indicating the position of the sun. The box indicated ABSORBER TEMP may be any suitable temperature measuring device while the box indicated WIND SPEED may be a conventional wind guage.

During operation of system 10, the condition sensing mechanisms just described continually feed input into the master logic control which has conventional means for processing these inputs and energizing the appropriate solenoids. For example, during normal tracking operation on a sunny day, when the wind velocity is low, that is, below the stowing level, and the receiver is not overheating, the solenoids 82, 84, 116 and 118 will operate in response to the input derived from the SOLAR POSITION sensor, that is, in an automatic tracking mode. Should the day become cloudy so that information from the SOLAR POSITION sensor is erratic at best, as indicated by information from the SOLAR RADIATION SENSOR, these latter solenoids will be automatically driven in a preprogrammed way to follow the sun as closely as possible, preferably within ±15% accuracy. Should a high wind develop, this information is delivered to the logic control by means of the WIND SPEED SENSOR. If a wind velocity at or above a predetermined level for example, at or above thirty miles per hour is sustained for a predetermined period of time, this information is processed and solenoid C is automatically deenergized for stowing the system. After the wind dies down, this latter solenoid may be energized again so that the panel can be raised. Finally, should the receiver overheat, this information is fed into the logic control which causes the system to defocus relative to the sun by suitable means (not shown) in order to cool down the receiver.

What is claimed is:
1. A solar concentrator, comprising:
 (a) a point focusing solar concentrating panel assembly, said assembly including
  (i) first means defining an overall reflecting surface of parabolic cross sectional configuration having a predetermined focal point and an outermost periphery which at least approximates a triangle, and
  (ii) second means for supporting said reflecting surface defining first means;
 (b) receiver means for converting solar energy to another form of energy;
 (c) means for fixedly supporting said receiver means at said predetermined focal point whereby to receive solar energy interrupted by said reflecting surface and reflected towards said focal point; and
 (d) means connected with a fixed horizontally extending support surface for supporting said panel assembly such that one side of said periphery is substantially parallel with and adjacent to said support surface, said panel assembly supporting means including
  (i) means supporting said panel assembly for pivotal movement above an axis parallel with said one side of said periphery between a stow position during which said reflecting surface is substantially horizontal and a raised operating position during which said reflecting surface is angled relative to said horizontal surface,
  (ii) means for tilting said panel assembly about said parallel axis,
  (iii) means supporting said panel assembly for rotation about a vertical axis through said support surface, and
  (iv) means for rotating said assembly about said vertical axis.

2. A solar concentrator according to claim 1 wherein said first means of said panel assembly includes a plurality of individual surface reflecting modules each of which defines a predetermined section of said overall reflecting surface and wherein said second means of said assembly supports said modules relative to one another so as to define said overall reflecting surfaces.

3. A solar concentrator according to claim 2 wherein each of said modules includes a triangular outermost periphery.

4. A solar concentrator according to claim 3 wherein said modules includes a plurality of groups thereof, wherein the surface sections of each of said groups, when supported in a predetermined way, together include a predetermined portion of said overall surface, said portions defining parabolic cross sectional configurations having different focal lengths relative to one another so as to reduce the depth of said overall surface as compared to a single surface defined by a single focal length and said focal point, however, said portions together defining said overall surface having said predetermined focal point, and wherein said second means of said assembly supports said groups of modules in said predetermined way.

5. A solar concentrator according to claim 4 wherein said second means of said assembly supports said module groups so as to define lateral spaces between specific modules of different groups sufficient to allow wind to pass therethrough while retaining the parabolic configuration of said reflecting surface.

6. A solar concentrator according to claim 1 wherein said rotating means includes at least one wheel radially spaced outwardly from said vertical axis and mounted for movement along a predetermined path on said support surface and means for powering said wheel whereby to rotate said panel assembly about said vertical axis.

7. A solar concentrator according to claim 6 wherein said tilting means includes a hydraulically powered cylinder unit and wherein said wheel powering means is an hydraulically powered means.

8. A method of collecting solar energy, comprising:
(a) initially placing a solar collecting panel having an outermost periphery which at least approximates a triangle in an operating position at a predetermined orientation relative to the sun at a given point in time during the day, said panel being placed on a horizontally extending support surface with one straight section of its outer periphery parallel with said surface;
(b) as the sun moves during the course of the day, automatically moving said panel such that its orientation relative to the sun remains substantially constant;
(c) in the event that said panel is exposed to wind of a velocity exceeding a predetermined value for a predetermined period of time while in said operating position, automatically moving said panel to a stowed position and maintaining said straight section parallel with said support surface; and
(d) automatically moving said panel back to its operating position in the event that the velocity of said wind falls below said value.

9. A method according to claim 8 wherein said panel is moved by pivoting said panel about a predetermined horizontal axis and rotated about a predetermined vertical axis.

10. A method according to claim 9 wherein said panel is rotated by applying a force thereto at a point horizontally spaced from said vertical axis.

11. A point focusing solar concentrator comprising a substantially triangular reflecting surface of parabolic configuration serving to interrupt solar energy and reflect and focus said energy into a receiver, a frame means connected with a horizontally extending planar surface for pivotally mounting said reflector about a horizontal axis while maintaining one side of said triangle parallel with said planar surface, means for tilting said reflector about said axis, and means for rotating said reflector about a vertical axis, whereby to follow the position of the sun.

12. A solar concentrator, comprising:
(a) a point focusing solar concentrating panel assembly, said assembly including
 (i) first means defining an overall reflecting surface of parabolic cross sectional configuration having a predetermined focal point and an outermost periphery which at least approximates a triangle, and
 (ii) second means for supporting said reflecting surface defining first means;
(b) receiver means for converting solar energy to another form of energy;
(c) means for fixedly supporting said receiver means at said predetermined focal point whereby to receive solar energy interrupted by said reflecting surface and reflected towards said focal point;
(d) means connected with a fixed horizontally extending support surface for supporting said panel assembly such that one side of said periphery is substantially parallel with and adjacent to said support surface, said panel assembly supporting means including
 (i) means supporting said panel assembly for pivotal movement about an axis parallel with said one side of said periphery between a stow position during which said reflecting surface is substantially horizontal and a raised operating position during which said reflecting surface is angled relative to said horizontal surface,
 (ii) means for tilting said panel assembly about said parallel axis.
 (iii) means supporting said panel assembly for rotation about a vertical axis through said support surface,
 (iv) means for rotating said assembly about said vertical axis; and
(e) means cooperating with said panel assembly supporting means for automatically moving said panel assembly from its raised operating position to its stowed position when exposed to a wind above a predetermined velocity.

* * * * *